(12) United States Patent
Matsumoto

(10) Patent No.: US 12,506,321 B2
(45) Date of Patent: Dec. 23, 2025

(54) VERTICAL CAVITY SURFACE EMITTING LASER AND HEAD GIMBAL ASSEMBLY

(71) Applicant: Western Digital Technologies, Inc., San Jose, CA (US)

(72) Inventor: Takuya Matsumoto, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 1134 days.

(21) Appl. No.: 17/463,089

(22) Filed: Aug. 31, 2021

(65) Prior Publication Data

US 2022/0407292 A1 Dec. 22, 2022

Related U.S. Application Data

(60) Provisional application No. 63/211,288, filed on Jun. 16, 2021, provisional application No. 63/211,302, filed on Jun. 16, 2021.

(51) Int. Cl.
*H01S 5/042* (2006.01)
*G11B 5/48* (2006.01)
(Continued)

(52) U.S. Cl.
CPC ........ *H01S 5/04256* (2019.08); *G11B 5/4826* (2013.01); *G11B 5/4866* (2013.01);
(Continued)

(58) Field of Classification Search
CPC ............... H01S 5/04256; H01S 5/0201; H01S 5/02326; H01S 5/0233; H01S 5/0237;
(Continued)

(56) References Cited

U.S. PATENT DOCUMENTS 7,627,018 B1 12/2009 Guilfoyle et al.
8,107,326 B1 * 1/2012 Hirano ................... G11B 5/314
369/112.27
(Continued)

FOREIGN PATENT DOCUMENTS

JP H0669605 A 3/1994
JP 2000101020 A 4/2000
(Continued)

OTHER PUBLICATIONS

International Search Report and Written Opinion for International Application No. PCT/US2022/019987 dated Aug. 9, 2022.
(Continued)

*Primary Examiner* — Yuanda Zhang
(74) *Attorney, Agent, or Firm* — Patterson + Sheridan, LLP

(57) ABSTRACT

Embodiments of the present disclosure generally relate to a vertical cavity surface emitting laser, a head gimbal assembly for mounting a vertical cavity surface emitting laser, and devices incorporating such articles. In an embodiment, a vertical cavity surface emitting laser (VCSEL) device is provided. The VCSEL device includes a chip for mounting on a slider and two laser diode electrodes. The chip has six surfaces, wherein a first surface of the chip is for facing the slider, a second surface of the chip is opposite the first surface, and the two laser diode electrodes are positioned in any combination on one or more of a third surface, a fourth surface, a fifth surface, or a sixth surface of the chip.

23 Claims, 13 Drawing Sheets

(51) Int. Cl.
*G11B 13/08* (2006.01)
*H01S 5/02* (2006.01)
*H01S 5/02326* (2021.01)
*H01S 5/0233* (2021.01)
*H01S 5/0237* (2021.01)
*H01S 5/183* (2006.01)
*H01S 5/42* (2006.01)
*G11B 5/00* (2006.01)

(52) U.S. Cl.
CPC ............ *G11B 13/08* (2013.01); *H01S 5/0201* (2013.01); *H01S 5/02326* (2021.01); *H01S 5/0233* (2021.01); *H01S 5/0237* (2021.01); *H01S 5/04257* (2019.08); *H01S 5/18394* (2013.01); *H01S 5/423* (2013.01); *G11B 2005/0021* (2013.01); *H01S 5/183* (2013.01)

(58) Field of Classification Search
CPC .. H01S 5/04257; H01S 5/18394; H01S 5/423; H01S 5/183; G11B 5/4826; G11B 5/4866; G11B 13/08; G11B 2005/0021; G11B 5/314

See application file for complete search history.

(56) References Cited

U.S. PATENT DOCUMENTS

| | | |
|---|---|---|
| 8,116,171 B1 | 2/2012 | Lee |
| 8,139,448 B1 | 3/2012 | Hirano et al. |
| 8,184,507 B1 | 5/2012 | Hirano et al. |
| 8,343,364 B1 | 1/2013 | Gao et al. |
| 8,804,468 B2 | 8/2014 | Zhao et al. |
| 9,065,236 B2 | 6/2015 | Goulakov et al. |
| 9,196,278 B1 | 11/2015 | Tatah et al. |
| 9,286,920 B1* | 3/2016 | Hu ........................ G11B 5/3163 |
| 10,127,938 B2 | 11/2018 | Goggin et al. |
| 10,229,704 B2 | 3/2019 | Blaber et al. |
| 10,242,702 B1 | 3/2019 | Peng |
| 10,262,683 B2 | 4/2019 | Staffaroni et al. |
| 10,403,315 B2 | 9/2019 | Matsumoto et al. |
| 10,636,442 B2 | 4/2020 | Matsumoto et al. |
| 11,574,647 B1 | 2/2023 | Yu et al. |
| 11,798,582 B2 | 10/2023 | Puri et al. |
| 11,894,031 B1 | 2/2024 | Jin et al. |
| 12,119,032 B1 | 10/2024 | Matsumoto et al. |
| 2005/0167830 A1 | 8/2005 | Chang et al. |
| 2005/0183960 A1 | 8/2005 | Andideh et al. |
| 2006/0220192 A1 | 10/2006 | Kurachi et al. |
| 2006/0251137 A1 | 11/2006 | Sung et al. |
| 2007/0201530 A1 | 8/2007 | Rhee et al. |
| 2008/0054457 A1 | 3/2008 | Lin et al. |
| 2009/0154514 A1 | 6/2009 | Oh et al. |
| 2009/0225636 A1 | 9/2009 | Hirano et al. |
| 2010/0085664 A1 | 4/2010 | Hirata et al. |
| 2011/0216635 A1* | 9/2011 | Matsumoto .......... G11B 5/6088 |
| 2012/0113770 A1 | 5/2012 | Stipe |
| 2012/0230361 A1 | 9/2012 | Adachi et al. |
| 2013/0286799 A1 | 10/2013 | Zhu et al. |
| 2014/0098652 A1 | 4/2014 | Tomiyama et al. |
| 2016/0284370 A1 | 9/2016 | Takayama et al. |
| 2017/0256277 A1* | 9/2017 | Peng ..................... G11B 5/105 |
| 2018/0335575 A1 | 11/2018 | Gudeman |
| 2020/0091679 A1 | 3/2020 | Furuyama |
| 2020/0144792 A1* | 5/2020 | Dummer ................. H01S 5/423 |
| 2021/0201942 A1 | 7/2021 | Zhao et al. |
| 2021/0398556 A1 | 12/2021 | Stipe et al. |
| 2021/0398557 A1 | 12/2021 | Stipe et al. |
| 2022/0189507 A1 | 6/2022 | Stipe et al. |
| 2022/0407292 A1 | 12/2022 | Matsumoto |
| 2024/0296866 A1 | 9/2024 | Xu et al. |

FOREIGN PATENT DOCUMENTS

| | | |
|---|---|---|
| JP | 200322967 A | 8/2003 |
| JP | 2008152869 A | 7/2008 |
| JP | 2011096857 A | 5/2011 |
| JP | 2011124314 A | 6/2011 |
| JP | 2013098404 A | 5/2013 |
| JP | 2020046511 A | 3/2020 |

OTHER PUBLICATIONS

International Search Report and Written Opinion for International Application No. PCT/US2022/016654 dated Jun. 27, 2022.
U.S. Appl. No. 18/229,779, filed Aug. 3, 2023.
International Search Report and Written Opinion for Application No. PCT/US2024/012257 dated May 17, 2024.
Datta, Anurup et al., "Improved Near-Field Transducer Design for Heat-Assisted Magnetic Recording", IEEE Transactions on Magnetics, vol. 52, No. 12, Dec. 2016, pp. 1-6.
Zhou, Nan et al., "Plasmonic near-field transducer for heat-assisted magnetic recording", Science Wise Publishing & De Gruyter, 2014, pp. 141-155.
Challener, W. A. et al., "Heat-assisted magnetic recording by a near-field transducer with efficient optical energy transfer", Nature Photonics, Mar. 2009, pp. 220-224.
Kryder, Mark H. et al., "Heat Assisted Magnetic Recording", Proceedings of the IEEE, vol. 96, No. 11, Nov. 2008, pp. 1-27.
Du, Tianxiang et al., "A Novel Design of Capacitive Plasmonic Near Field Transducer", Applied Physics, Jun. 2024, pp. 1-4.

* cited by examiner

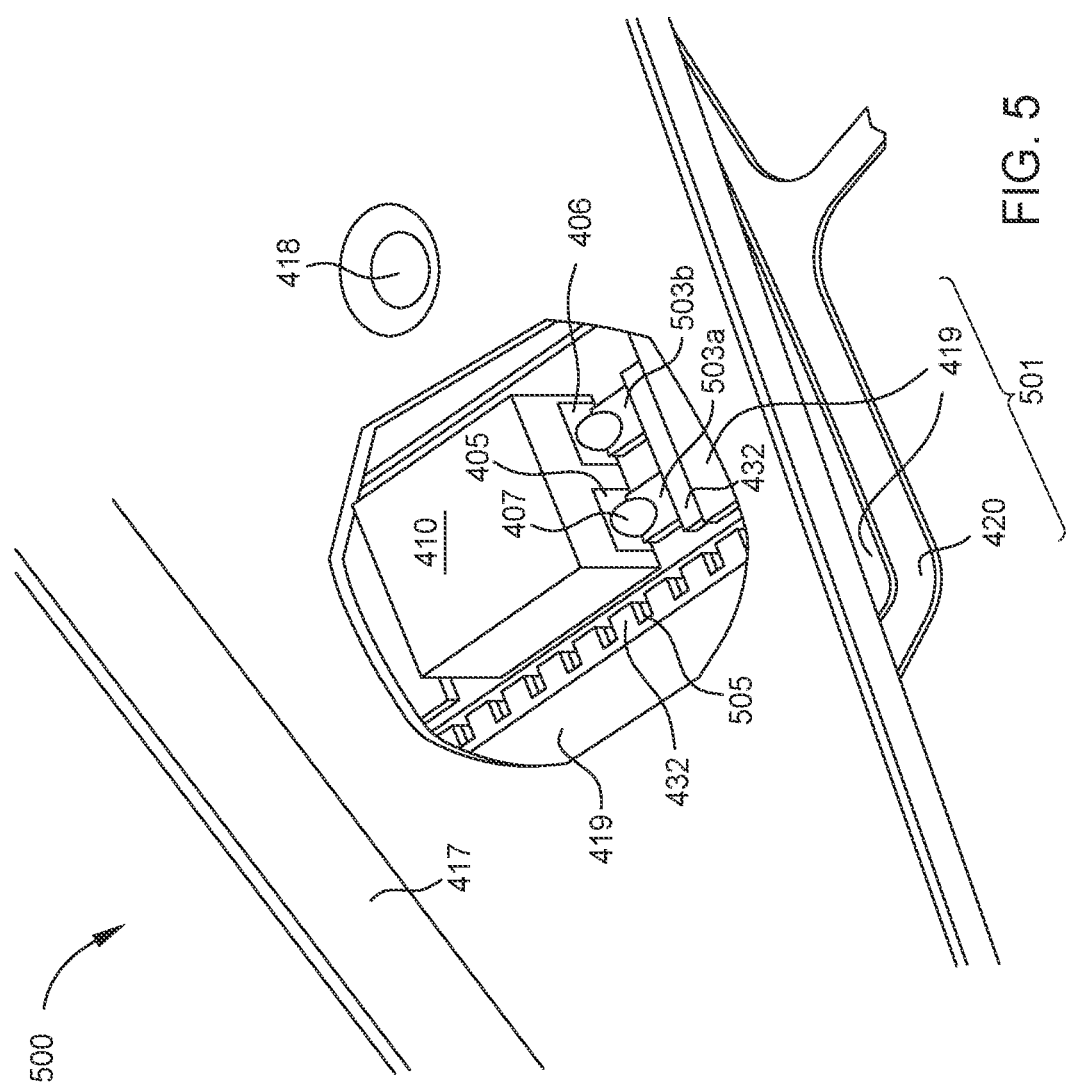

VERTICAL CAVITY SURFACE EMITTING LASER AND HEAD GIMBAL ASSEMBLY

CROSS-REFERENCE TO RELATED APPLICATIONS

This application claims priority to U.S. Provisional Application No. 63/211,288, filed Jun. 16, 2021 and U.S. Provisional Application No. 63/211,302, filed Jun. 16, 2021, each of which are incorporated herein by reference in their entirety.

BACKGROUND OF THE DISCLOSURE

Field of the Disclosure

Embodiments of the present disclosure generally relate to a vertical cavity surface emitting laser, a head gimbal assembly for mounting a vertical cavity surface emitting laser, and devices incorporating such articles.

Description of the Related Art

Heat-assisted magnetic recording (HAMR) is a type of energy-assisted recording technology to improve the recording density of a magnetic recording medium. In HAMR, a laser source is located next to or near the write element in order to produce heat, such as a laser source exciting a near-field transducer (NFT) to produce heat at a write location of a magnetic recording medium. One approach to providing heat in HAMR involves the use of a vertical cavity surface emitting lasers (VCSEL) to direct laser light through the magnetic recording head to the magnetic media. Here, the VCSEL is mounted to a top surface of a slider, and one or more laser beams are emitted from the bottom surface of the VCSEL and directed to a corresponding number of waveguide structures within the HAMR head. The waveguide structures feed into a multimode interference (MMI) device that then directs the laser into a waveguide for focusing on a near field transducer (NFT).

Although conventional VCSELs have reduced costs relative to other lasers, e.g., edge emitting laser diodes, and have no mode hopping, conventional VCSELs do not permit active alignment to maximize the coupling between the waveguide and the laser. This lack of active alignment is a result of the laser diode electrodes of VCSELs being connected to, or facing, the top surface of the slider. Further, since the laser diode electrodes of the VCSEL are connected to the slider, complicated back-side patterning processes are typically employed during slider fabrication.

There is a need for new and improved VCSELs, head gimbal assemblies (HGAs) for mounting VCSELs, and devices incorporating such articles.

SUMMARY OF THE DISCLOSURE

Embodiments of the present disclosure generally relate to a VCSEL, a head gimbal assembly for mounting a VCSEL, and devices incorporating such articles.

In an embodiment, a vertical cavity surface emitting laser (VCSEL) device is provided. The VCSEL device includes a chip for mounting on a slider and two laser diode electrodes. The chip has six surfaces, wherein a first surface of the chip is for facing the slider, a second surface of the chip is opposite the first surface, and the two laser diode electrodes are positioned in any combination on one or more of a third surface, a fourth surface, a fifth surface, or a sixth surface of the chip.

A head gimbal assembly is provided. The head gimbal assembly includes a suspension, a slider mounted on the suspension, and a vertical cavity surface emitting laser (VCSEL) device mounted on the slider. The VCSEL device includes a chip for mounting on the slider, the chip having six surfaces, wherein: a first surface of the chip is coupled to a top surface of the slider; and a second surface of the chip is opposite the first surface. The VCSEL device further includes two laser diode electrodes positioned in any combination on one or more of a third surface, a fourth surface, a fifth surface, or a sixth surface of the chip.

In another embodiment, a head gimbal assembly is provided. The head gimbal assembly includes a metal pad, and a vertical cavity surface emitting laser (VCSEL) device. The VCSEL device includes a chip for mounting on a slider, the chip having six surfaces, wherein: a first surface of the chip is for facing the slider; the first surface is coupled to the metal pad; and a second surface of the chip is opposite the first surface. The VCSEL device further includes two laser diode electrodes positioned in any combination on one or more of a third surface, a fourth surface, a fifth surface, or a sixth surface of the chip.

In another embodiment, a head gimbal assembly is provided. The head gimbal assembly includes a vertical cavity surface emitting laser (VCSEL) device comprising a chip for mounting on a slider, the chip having six surfaces, wherein: a first surface of the chip is for facing the slider; a second surface of the chip is opposite the first surface; and two laser diode electrodes positioned in any combination on one or more of a third surface, a fourth surface, a fifth surface, or a sixth surface of the chip. The head gimbal assembly further includes a metal pad coupled to the first surface of the chip, and a trench or protrusion located between the two laser diode electrodes and the metal pad.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is a perspective view of a portion of an example heat assisted magnetic recording head gimbal assembly according to at least one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present disclosure generally relate to a vertical cavity surface emitting laser (VCSEL), a head-gimbal assembly for mounting VCSEL, and to devices incorporating such articles, e.g., magnetic media drives. Processes for fabricating VCSELs described herein are also described.

The inventors have found new and improved VCSELs that, unlike conventional VCSELs, enable active alignment by, e.g., placing the laser diode electrodes of the VCSEL on a different VCSEL surface than that surface connected to the slider. Briefly, and in some embodiments, the VCSELs described herein include a multi-surfaced chip for mounting on a slider. A first surface of the chip is for facing the slider, a second surface of the chip is opposite the first surface, and side surfaces to which two laser diode electrodes can be positioned on, or coupled to. Because the laser diode electrodes are coupled to, or positioned on, the side surfaces of the VCSEL, active alignment during use of the VCSEL and devices incorporating VCSELs can be achieved. In addition, the VCSELs described herein enable simpler manufacturing processes for the slider and HGAs incorporating the VCSELs, thereby reducing costs.

Figure 1:
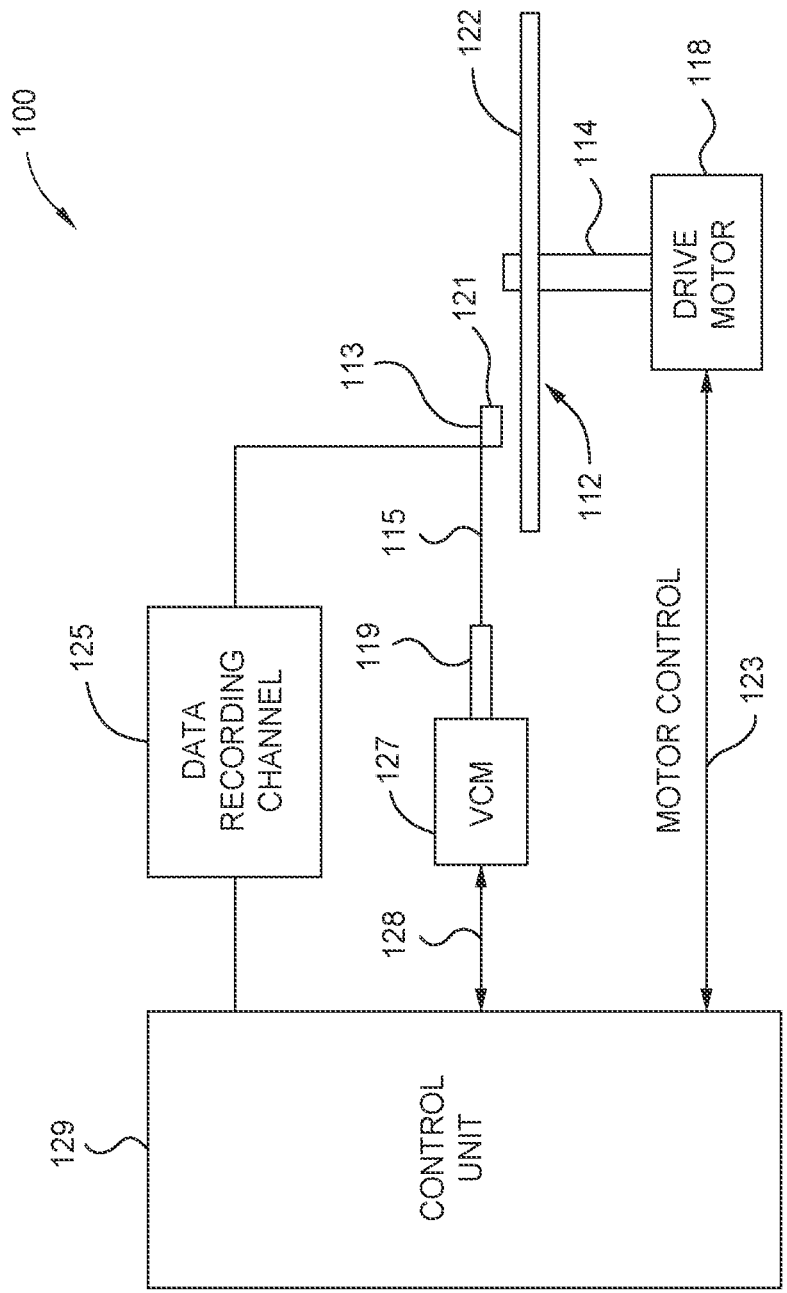
FIG. 1 is a schematic illustration of an example magnetic media drive including a HAMR magnetic write head according to at least one embodiment of the present disclosure.

FIG. 1 is a schematic illustration of certain embodiments of a magnetic media drive including a HAMR magnetic write head. Such magnetic media drive may be a single drive/device or include multiple drives/devices. For the ease of illustration, a single disk drive 100 is shown according to an embodiment. The disk drive 100 includes a magnetic recording medium 112 (oftentimes referred to as magnetic disk 112) supported on a spindle 114 and rotatable by a drive motor 118. The magnetic recording on each magnetic disk 112 is in the form of any suitable patterns of data tracks, such as annular patterns of concentric data tracks (not shown) on the magnetic disk 112. The magnetic recording medium 112 (or magnetic disk 112) may be rotatable.

A slider 113 is positioned near the magnetic disk 112. Each slider 113 supports a head assembly 121 (e.g., a reading/recording head assembly) including one or more read heads and one or more write heads such as a HAMR write head. In operation, as the magnetic disk 112 rotates, the slider 113 moves radially in and out over the disk surface 122 so that the head assembly 121 (e.g., a head gimbal assembly) may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127, as shown in FIG. 1, may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 includes logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
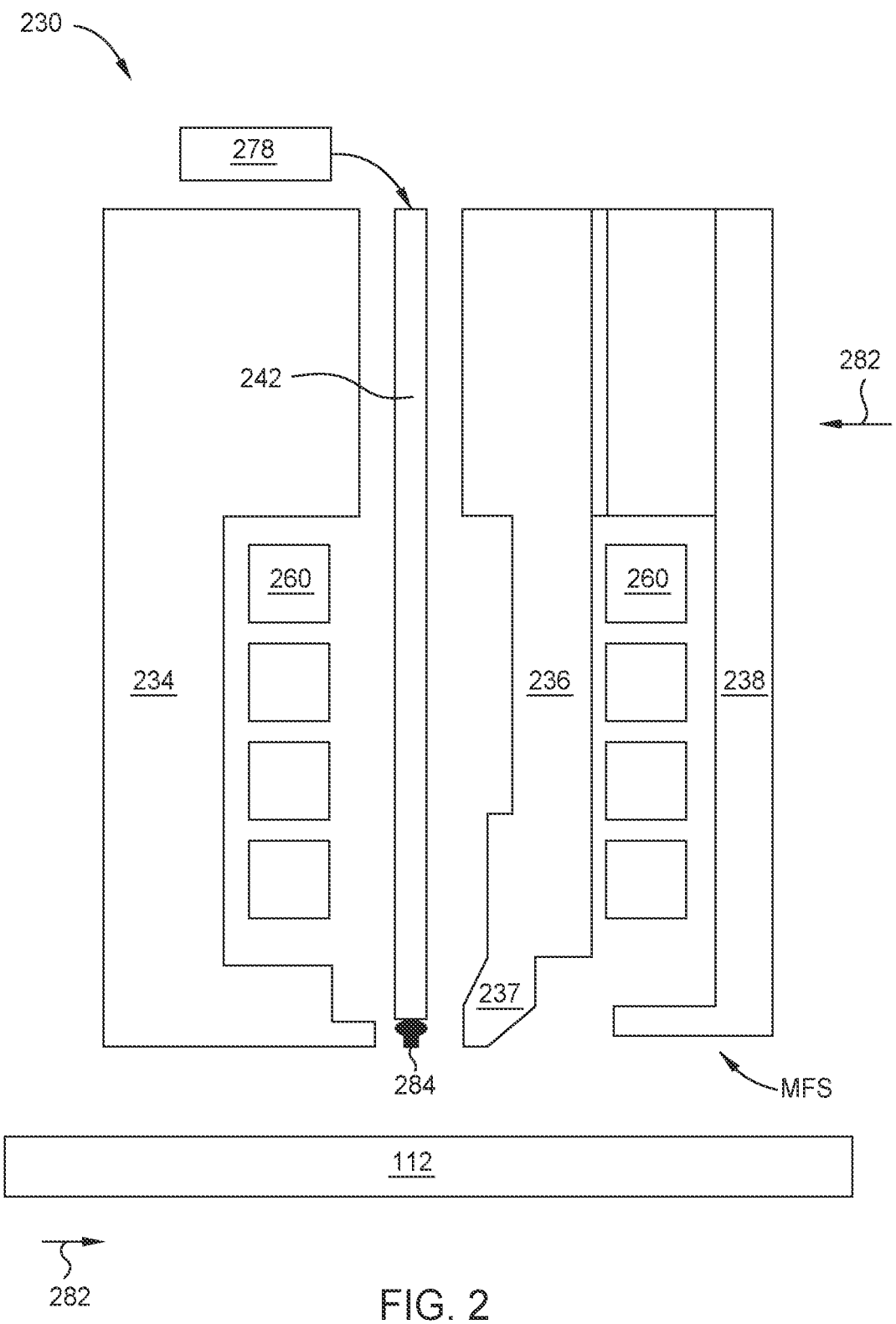
FIG. 2 is a schematic illustration of certain embodiments of a cross-sectional side view of an example HAMR write head facing a magnetic disk according to at least one embodiment of the present disclosure.

FIG. 2 is a schematic illustration of certain embodiments of a cross-sectional side view of a HAMR write head 230 facing a magnetic disk 112. The HAMR write head 230 can correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the magnetic disk 112. As shown in FIG. 2, the magnetic disk 112 and the HAMR write head 230 relatively moves in the direction indicated by the arrows 282 (need to change direction).

The HAMR write head 230 includes a main pole 236 disposed between a leading shield 234 and a trailing shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. In some embodiments, the coil 260 can be a helical structure or one or more sets of pancake structures. The leading shield 234 and/or the trailing shield 238 can act as the return pole for the main pole 236. The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 in a location proximate to where the main pole tip 237 applies the magnetic write field to the storage media. A waveguide 242 (or waveguide structure) is positioned between the main pole 236 and the leading shield 234. The waveguide 242 can include a core layer and a cladding layer surrounding the core layer. The waveguide 242 conducts light from a light source 278 of electromagnetic radiation, which can be, for example, ultraviolet, infrared, or visible light. The light source 278 can be, for example, a laser diode, or other suitable laser light source for directing a light beam toward the waveguide 242. Various suitable techniques for coupling the light source 278 into the waveguide 242 can be used. For example, the light source 278 can work in combination with an optical fiber and external optics for directing a light beam to the waveguide 242. Alternatively, the light source 278 can be mounted on the waveguide 242 and the light beam can be directly coupled into the waveguide 242 without the need for external optical configurations. Once the light beam is coupled into the waveguide 242, the light propagates through the waveguide 242 and heats a portion of the media as the media moves relative to the HAMR write head 230, as shown by arrows 282.

The waveguide 242 (or waveguide structure) can include a plurality of waveguides. A multimode interference device can be coupled to a first waveguide or a plurality of first waveguides at a first end of the multimode interference device, and a second waveguide or a plurality of second waveguides can be coupled to a second end opposite the first end of the MMI device, the plurality of second waveguides extending from the MMI device to the top surface of the slider discussed herein. The first waveguide (or waveguide structure) and/or the second waveguide (or waveguide structure) can be coupled to an NFT as discussed below.

The HAMR write head 230 includes a near-field transducer (NFT) 284 to concentrate the heat in the vicinity of the end of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS concentrating electric charge at the tip of the NFT 284 which in turn capacitively couples to the magnetic disk and heats a precise area of the magnetic disk 112 by Joule heating. One possible design for the NFT 284 of the HAMR write head is a lollipop design with a disk portion and a peg extending between the disk and the MFS. The NFT 284 can be placed in close proximity to the main pole 236. The NFT 284 can be relatively thermally isolated and can absorb a significant portion of the laser power while it is in resonance.

Various embodiments of the VCSELs and HGAs described below can be used with the magnetic media drive and HAMR write head discussed above.

Example VCSELs and HGAs

Embodiments of the present disclosure also relate to VCSELs and HGAs incorporating VCSELs. VCSELs have a number of significant advantages, relative to edge emitting laser diodes (EELDs), for use as the light source in HAMR. EELDs used today are typically mounted to a sub-mount because it is difficult to bond the edge-emitting facet face of the laser directly to the top of the slider. This sub-mount is then bonded to the slider. Conventional VCSELs, in contrast, have bonding electrodes on the surface-emitting face which match corresponding electrodes on the top surface of the slider. These electrodes can be bonded together by laser-assisted solder reflow and can also serve as electrical connections for energizing the laser. By eliminating the need for a sub-mount, the light source cost can be significantly reduced.

Although conventional VCSELs have reduced costs relative to other lasers, e.g., EELDs, and have no mode hopping, conventional VCSELs do not permit active alignment. This is a result of the laser diode electrodes of VCSELs being connected to, or facing, the top surface of the slider. Embodiments described herein, unlike state-of-the-art VCSELs, enable active alignment.

Figure 3A:
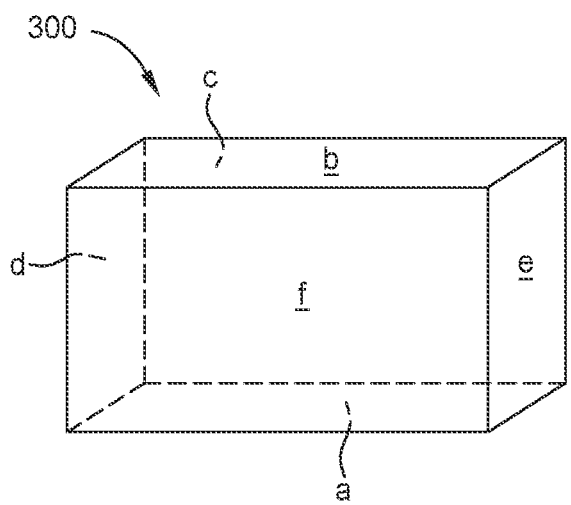
FIG. 3A shows surfaces of a VCSEL, without laser diode electrodes, according to at least one embodiment of the present disclosure.

FIG. 3A shows surfaces of a VCSEL 300 chip according to some embodiments. Although the VCSEL 300 is shown having a rectangular prism morphology, other suitable morphologies or shapes, such as cubic, are contemplated. The VCSEL 300 has a first surface a (e.g., a bottom surface) which can be coupled, directly or indirectly, to the slider and a second surface b (e.g., a top surface) opposite the first surface a. One or more of the other surfaces—a third surface c (e.g., a back surface), a fourth surface d (e.g., a side surface), a fifth surface e (e.g., a side surface), and a sixth surface f (e.g., a front surface)—are utilized for positioning or coupling one or more laser diode electrodes (not shown) thereon, in any combination. Third surface c, fourth surface d, fifth surface e, and sixth surface f, are side surfaces of the VCSEL 300. The number of laser diode electrodes positioned on, or coupled to, one or more side surfaces of the VCSEL can be any suitable number, such as 1, 2, 3, 4, 5, or 6 laser diode electrodes, such as 1 or 2 laser diode electrodes.

In some embodiments, the two laser diode electrodes are positioned on, or coupled to, the same side surface. For example, two laser diode electrodes can be positioned on, or coupled to, the third surface c; two laser diode electrodes can be positioned on, or coupled to, the fourth surface d; two laser diode electrodes can be positioned on, or coupled to, the fifth surface e; or two laser diode electrodes can be positioned on, or coupled to, the sixth surface f.

In some embodiments, one laser diode electrode is positioned on, or coupled to, to one surface of the VCSEL, and another laser diode electrode is positioned on, or coupled to, a different surface of the VCSEL, in any combination. For example, and as non-limiting illustrations, one laser diode electrode can be positioned on, or coupled to, the third surface c and the other laser diode electrode can be positioned on, or coupled to, the fourth surface d; or one laser diode electrode is positioned on, or coupled to, the third surface c and the other laser diode electrode is positioned on, or coupled to, the fifth surface e. Other orientations for coupling the laser diode electrodes to the VCSEL 300 are contemplated.

The VCSELs described herein can have various dimensions. For example, and in some embodiments, the bottom surface (e.g., first surface a) and the top surface (e.g., second surface b) of the VCSEL has a height of about 75 µm to about 150 µm and/or a length of about 100 µm to about 250 µm. A side surface of the VCSEL can have the same or similar dimensions. A width of the bottom surface (e.g., first surface a) and the top surface (e.g., second surface b) can be about 100 µm to about 250 µm, such as about 150 µm to about 200 µm, and/or a length of bottom surface (e.g., first surface a) and the top surface (e.g., second surface b) can be about 100 µm to about 250 µm, such as about 150 µm to about 200 µm. Smaller or larger dimensions for the VCSELs are contemplated. The dimensions of the various surfaces can be the same or different.

Figure 3B:
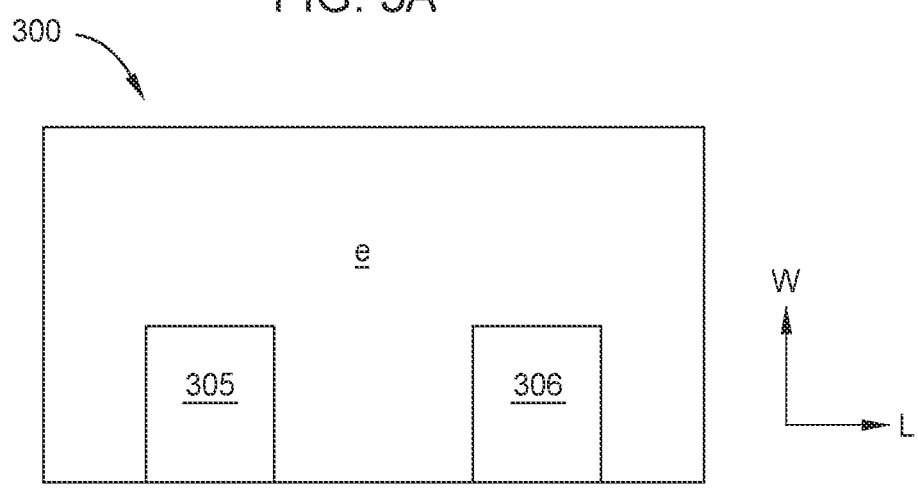
FIG. 3B shows a side view of an example VCSEL, having laser diode electrodes, coupled thereto according to at least one embodiment of the present disclosure.
Figure 3C:
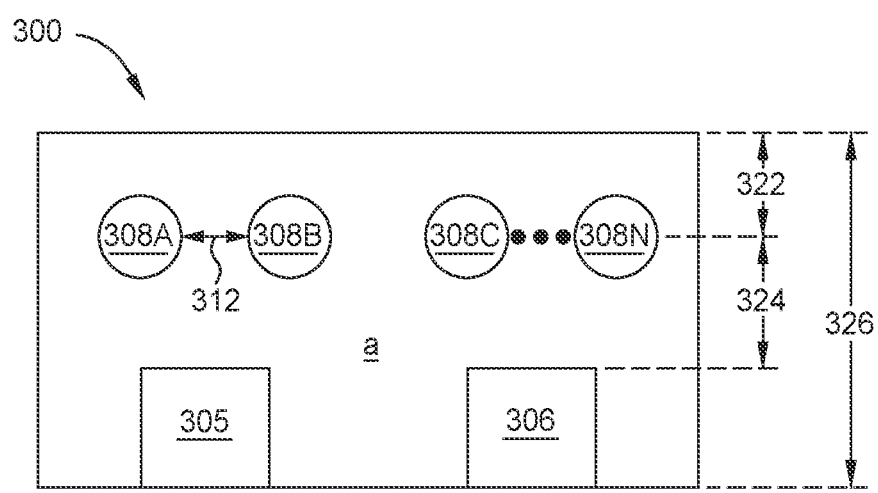
FIG. 3C shows a bottom view of the example VCSEL, where the laser diode electrodes extend to the bottom surface, according to at least one embodiment of the present disclosure.

FIGS. 3B and 3C are schematic illustrations of a side view and a bottom view of the VCSEL 300, respectively, according to some embodiments. The VCSEL 300 has one or more laser diode electrodes on a side surface as described above. In the non-limiting illustration shown in FIG. 3B, the VCSEL 300 has two laser diode electrodes 305, 306 positioned on, or coupled to, side surface e.

As shown in FIG. 3C, a plurality of laser apertures 308a-308n are disposed on the bottom surface a of the VCSEL 300. It is contemplated that a single laser aperture can be utilized instead of the plurality of laser apertures. The number of laser apertures 308a-308n matches the number of spot size converters of the slider. Each laser aperture 308a-308n can be spaced by a distance 312 of about 1 µm to about 20 µm, such as from about 2 µm to about 10 µm, from the adjacent laser aperture 308a-308n. Longer or shorter distances 312 are contemplated. The laser apertures 308a-308n can be aligned about a center line and each of the plurality laser apertures 308a-308n can be aligned to a corresponding input laser. The laser apertures 308a-308n can also be aligned with a corresponding laser aperture of the cavity (not shown). As shown in FIG. 3C, the two laser diode electrodes 305, 306 extend from the side surface e to the bottom surface a of the VCSEL 300.

Each of the laser apertures 308a-308n can, independently, have a diameter of about 1.5 µm to about 8 µm and can be on a 2 µm to 10 µm pitch, though larger or smaller diameters and pitches are contemplated. The center of the laser apertures 308a-308n can be spaced from the side by a distance 322 of about 35 µm to about 50 µm, though a larger or smaller distance 322 is contemplated. The center of the laser apertures 308a-308n can be spaced from the laser diode electrodes 305, 306 by a distance 324 of about 75 µm to about 90 µm, though a larger or smaller distance 324 is contemplated.

Figure 4A:
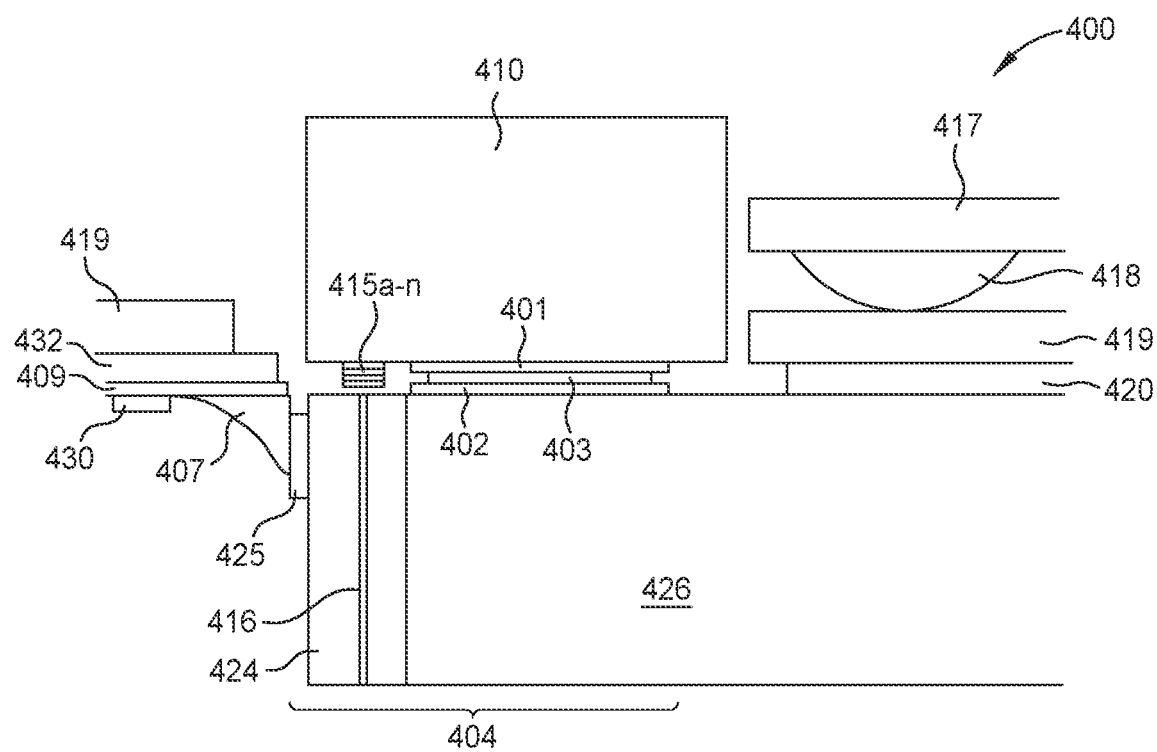
FIG. 4A is a schematic illustration of a cross-sectional view (down-track direction) of an example slider having an example VCSEL mounted thereto according to at least one embodiment of the present disclosure.
Figure 4B:
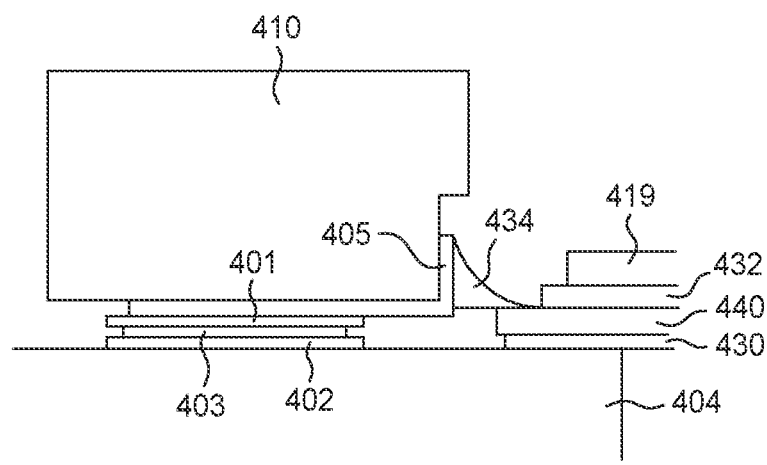
FIG. 4B is a cross-sectional view (cross-track direction) of the example VCSEL shown in FIG. 4A according to at least one embodiment of the present disclosure.
Figure 6B:
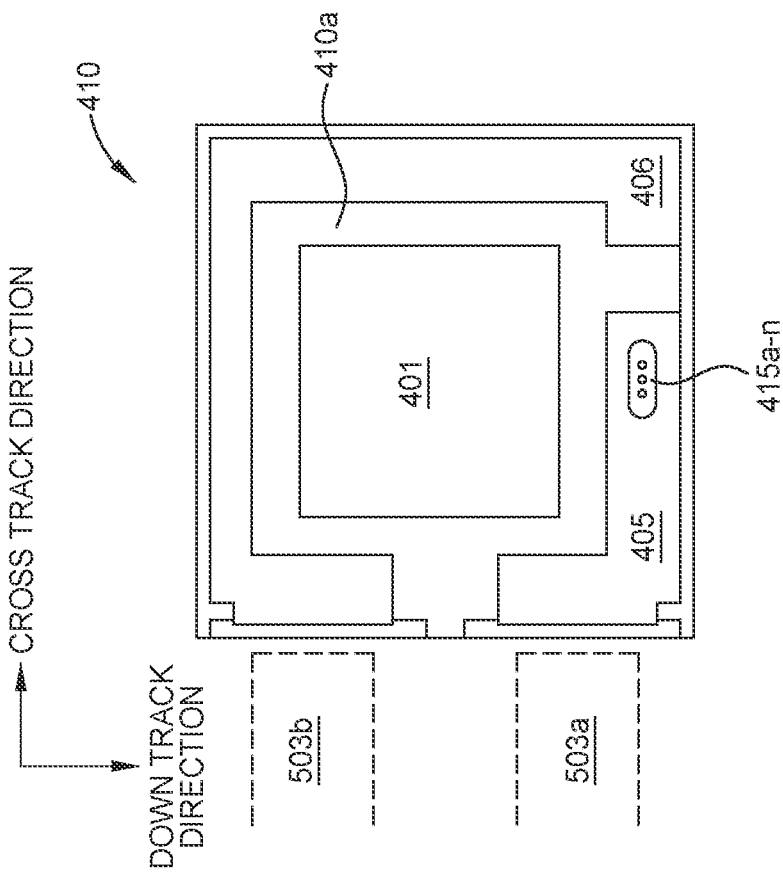
FIG. 6B is a bottom view of the example VCSEL shown in FIG. 6A according to at least one embodiment of the present disclosure.
Figure 6A:
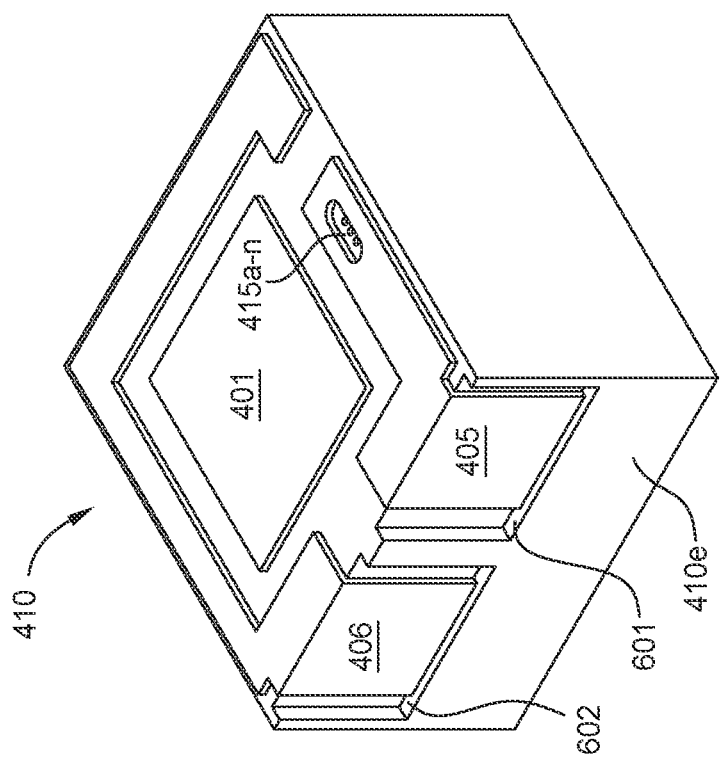
FIG. 6A is a schematic illustration of a perspective view of an example slider having an example VCSEL mounted thereto according to at least one embodiment of the present disclosure.

FIGS. 4A and 4B are schematic illustrations 400 of a cross-sectional view (down-track direction and cross-track direction, respectively) of a slider 404 having a VCSEL 410 chip mounted thereto according to some embodiments. The schematic illustrations shown in FIGS. 4A and 4B can be a portion of an HGA. A laser diode electrode 405 is coupled to, or positioned on, a side surface of the VCSEL 410. Although only one laser diode electrode 405 is shown coupled to the side surface 410e, another laser diode electrode (e.g., laser diode electrode 406 shown in FIG. 6A) is coupled to the same side surface 410e of the VCSEL 410. The laser diode electrodes 405, 406 extend from the side surface 410e of the VCSEL 410 to the bottom surface 410a of the VCSEL 410 as shown in FIGS. 6A and 6B.

Referring to FIG. 4A, the VCSEL 410 is mounted to the slider 404 via a pad 401, a pad 402, and a soldering material 403. The pad 401 and the pad 402 can each, independently, be a metal containing layer. The slider 404 includes a substrate, e.g., an AlTiC substrate, and a layer 424, e.g., an alumina containing layer. The pad 401 is coupled to the bottom surface 410a of the VCSEL 410 and the pad 402 is coupled to a top surface 404a of the slider 404. The pad 401, the pad 402, and the soldering material 403 can collectively form a contact after soldering. A conductive adhesive can be used in addition to, or instead of, the soldering material 403.

Further, embodiments are contemplated where at least one of the laser diode electrodes 405, 406 may be combined with the pad for mounting on a slider if, e.g., the pad is electrically isolated or grounded. For example, the spacing between the pad (e.g., the pad 401) and one or more of the laser diode electrodes 405, 406 of the VCSEL 410 can be zero. As another example, the metal of the pad (e.g., the pad 401) can be the same metal as the metal of one or more laser of the laser diode electrodes 405, 406.

The VCSEL 410 includes one or more cavities 415a-n through which one or more laser beams exit the VCSEL 410 and enter a single output waveguide 416 positioned within the layer 424. Any suitable number of cavities can be used such as from about 1 to about 16, such as from about 3 to about 12. Higher or lower number of cavities are contemplated. Each of the one or more laser beams emitted by the VCSEL 410 can operate at the same frequency and can be phase coherent. Each laser of the one or more laser beams emitted by the VCSEL 410 can have a power level from about 0.5 mW to about 20 mW, such as from about 1 mW to about 10 mW, such as from about 2 mW to about 8 mW, such as from about 4 mW to about 6 mW. Higher or lower power levels are contemplated. Although not shown, a multimode interference (MMI) device can be used and be disposed within the slider 404. When used, the MMI device combines the laser light fed from the cavities 415a-414n and emits a single laser through a single output waveguide 416. The single output waveguide 416 can emit laser light from the MMI device that includes the combined power of the plurality of input lasers accepted by the MMI device. The single output mode can be utilized to concentrate the optical power and couple to an NFT (e.g., NFT 284).

A slider pad 425 is coupled to a surface of the layer 424 of the slider 404. The slider pad 425 is coupled to a multilayer structure that includes a first polyimide layer 430, an electrode 409, a second polyimide layer 432, and a flexure 419. Coupling of the slider pad 425 to the multilayer structure can be accomplished by soldering material. A conductive adhesive can be used in addition to, or instead of, the soldering material 407.

A suspension (a portion of which is shown) which supports the slider 404 is disposed on the same surface of the slider 404 as the pad 402, e.g., top surface 404a. The suspension includes a flexure 419 and a load beam 417. The load beam is the main body of the suspension. The flexure 419 holds the slider 404, and the flexure 419 is attached to the load beam 417. In operation, the load beam 417 can push the slider 404 toward a disk with a dimple 418. Between the flexure 419 and the slider 404 is disposed a polyimide layer 420 that includes wires. The polyimide layer 420 that includes wires is for applying current or voltage to the components in the slider (magnetic head, heater for spacing control etc.) or for sending signals from the sensors (reader, contact sensor, thermal sensor) to the preamp.

FIG. 5 is a perspective view of a portion of a heat assisted magnetic recording head gimbal assembly 500. Although the head gimbal assembly 500 includes the VCSEL structure shown in FIGS. 4A and 4B, it is contemplated that the head gimbal assembly can be used with other VCSEL structures shown in described herein. The head gimbal assembly 500 includes a suspension 501 that includes the flexure 419 and the load beam 417, discussed above. The polyimide layer 420 that includes wires is positioned between the flexure 419 and the slider 404. The VCSEL 410 mounted on slider 404 is positioned next to the polyimide layer 420. The flexure 419 includes electrodes 503, 505. In the configuration shown in FIG. 5, the VCSEL is positioned on the slider such that laser diode electrode 405 and laser diode electrode 406 can be coupled to electrodes 503a and 503b respectively. The electrodes 503a, 503b serve to apply a current to the laser diode electrodes. Electrode 505 is coupled to the slider pad and serves to apply a current or voltage to the components in the slider (e.g. magnetic head, heater for spacing control etc.) or for sending signals from the sensors (reader, contact sensor, thermal sensor) to a preamp. Electrode 440 shown in FIG. 4B corresponds to electrode 503a, while electrode 409 in FIG. 4A corresponds to electrode 505.

Figure 6D:
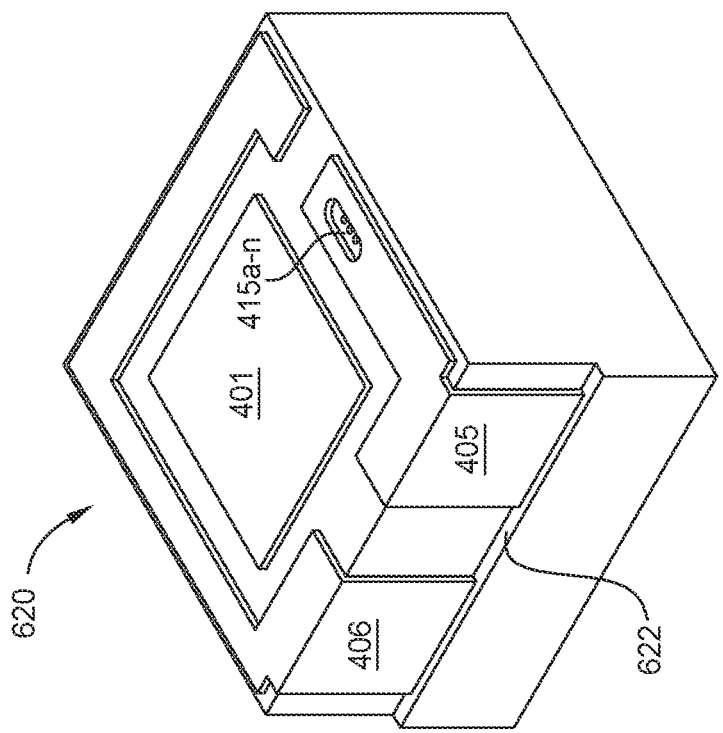
FIG. 6D is a perspective view of an example VCSEL, where the laser diode electrodes are disposed in a single trench having a width that is substantially the same size as a width of the VCSEL according to at least one embodiment of the present disclosure.
Figure 6C:
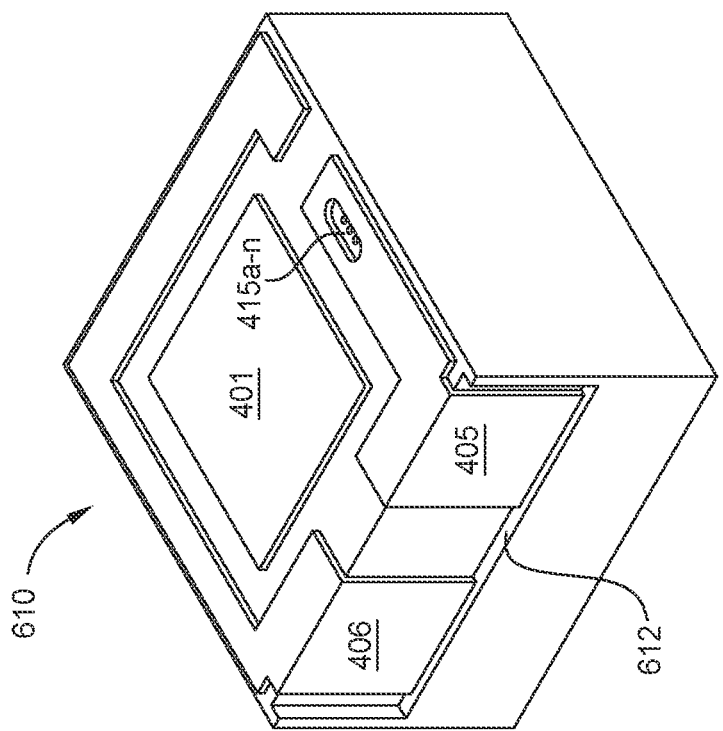
FIG. 6C is a perspective view of an example VCSEL, where the laser diode electrodes are disposed in a single trench having a width smaller than a width of the VCSEL, according to at least one embodiment of the present disclosure.

FIGS. 6A and 6B are schematic illustrations of a perspective view and a bottom view, respectively, of the VCSEL 410 chip shown in FIGS. 4A and 4B. FIGS. 6C and 6D illustrate non-limiting variations of the VCSEL 410 chip. In the orientation shown in FIGS. 6A-6D, the laser diode electrodes 405, 406 are positioned on, or coupled to, a side surface 410e of the VCSEL 410. The laser diode electrodes 405, 406 extend from the side surface 410e of the VCSEL 410 to the bottom surface 410a of the VCSEL 410. The pad 401, disposed on a bottom surface 410a of the VCSEL 410 is utilized to couple the VCSEL 410 to a slider, e.g., slider 404.

With respect to the variations of the VCSELs 410, 610, and 620, the number and width of the trenches in which the electrodes are disposed can be variable. For the VCSEL 410 shown in FIG. 6A, a first trench 601 in which a portion of laser diode electrode 405 is disposed, is separate from a second trench 602 in which laser diode electrode 406 is disposed.

With reference to the VCSEL 610 shown in FIG. 6C, the laser diode electrodes 405, 406 are disposed in a single trench 612 having a width that is smaller than a width of the VCSEL 610. Similarly, with respect to the VCSEL 620 shown in FIG. 6D, the laser diode electrodes 405, 406 are disposed in a single trench 622 having a width that is the same size, or substantially same size, as the width of the VCSEL 620. In some embodiments, the trench 622 extends to other sides of the VCSEL 620. This can enable simpler manufacture of the VCSEL. For example, when the trench 622 is extended to the side located near the cavities 815a-n (shown in FIG. 8), the trench 622 can reduce the damage of the cavities during, e.g., a dicing operation. Like the VCSEL 410, VCSELs 610 and 620 can be positioned on a slider (e.g., slider 404) via the pad 401. Further, the laser diode electrodes 405 and 406 of VCSELs 610 and 620, like VCSEL 410, can be coupled to electrodes 503a, 503b of the HGA.

Figure 7B:
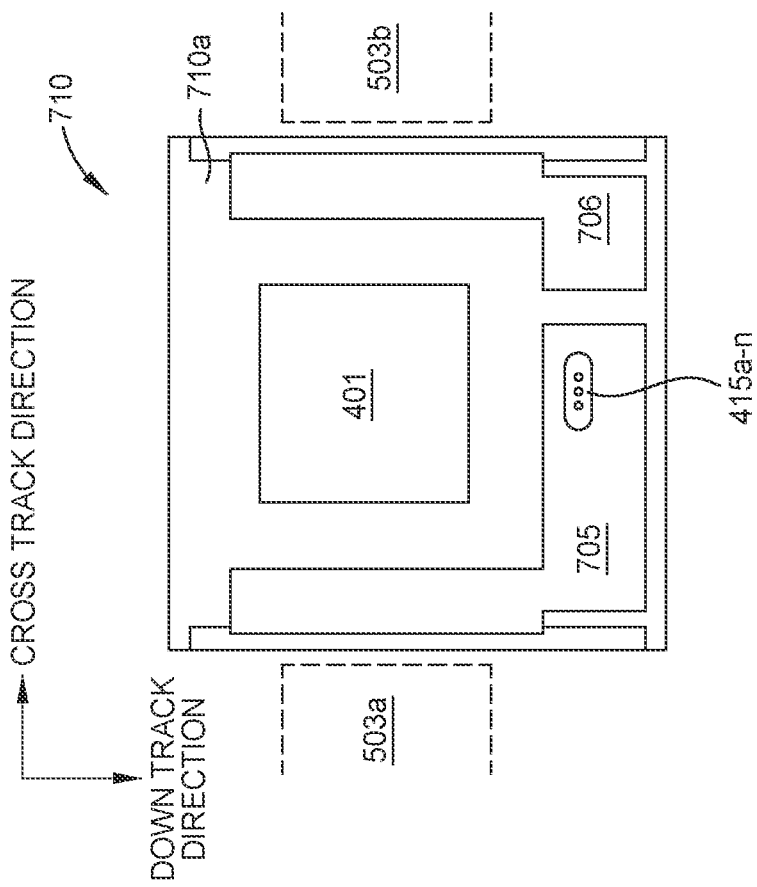
FIG. 7B is a bottom view of the example VCSEL shown in FIG. 7A according to at least one embodiment of the present disclosure.
Figure 7A:
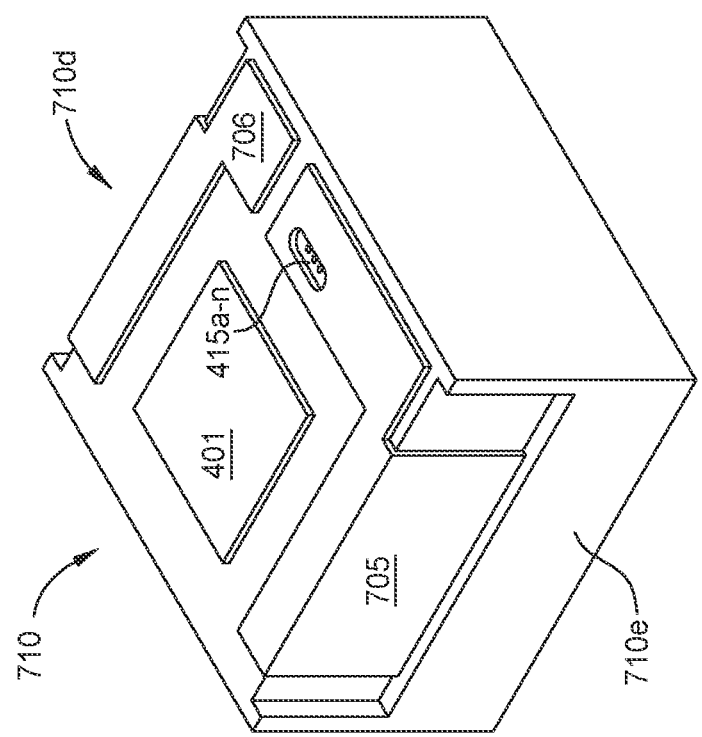
FIG. 7A is a perspective view of an example VCSEL according to at least one embodiment of the present disclosure.

FIG. 7A and FIG. 7B are schematic illustrations of a perspective view and a bottom view, respectively, of a VCSEL 710 chip. Various elements of FIGS. 7A and 7B, such as the pad 401, cavity 415a-n, and electrodes 503a, 503b on the suspension can be the same as, or similar to, those elements described above in relation to FIGS. 4A and 4B. In the orientation shown in FIGS. 7A and 7B, laser diode electrodes 705, 706 are positioned on, or coupled to, two different surfaces of the VCSEL 710—side surfaces 710e and 710d, respectively. The laser diode electrodes 705, 706 extend from their respective side surfaces to the bottom surface 710a of the VCSEL 710.

Referring to FIG. 7B, the laser diode electrode 705 is coupled to electrode 503a of a suspension of an HGA (e.g., the head gimbal assembly 500) and the laser diode electrode 706 is coupled to electrode 503b of the suspension. A pad 401 disposed on a bottom surface 710a of the VCSEL 710 is utilized to couple the VCSEL 710 to a slider. VCSEL 710 can be positioned on a slider such as slider 404 shown in FIGS. 4A and 4B, though the orientation of the laser diode electrodes 705, 706 relative to the slider are different. Properties, characteristics, and uses (e.g., in an HGA assembly, a magnetic media drive, etc.) of the VCSEL 710 chip can be the same as, or similar to, those properties, characteristics, and uses of the VCSEL 410 chip discussed above.

Figure 8A:
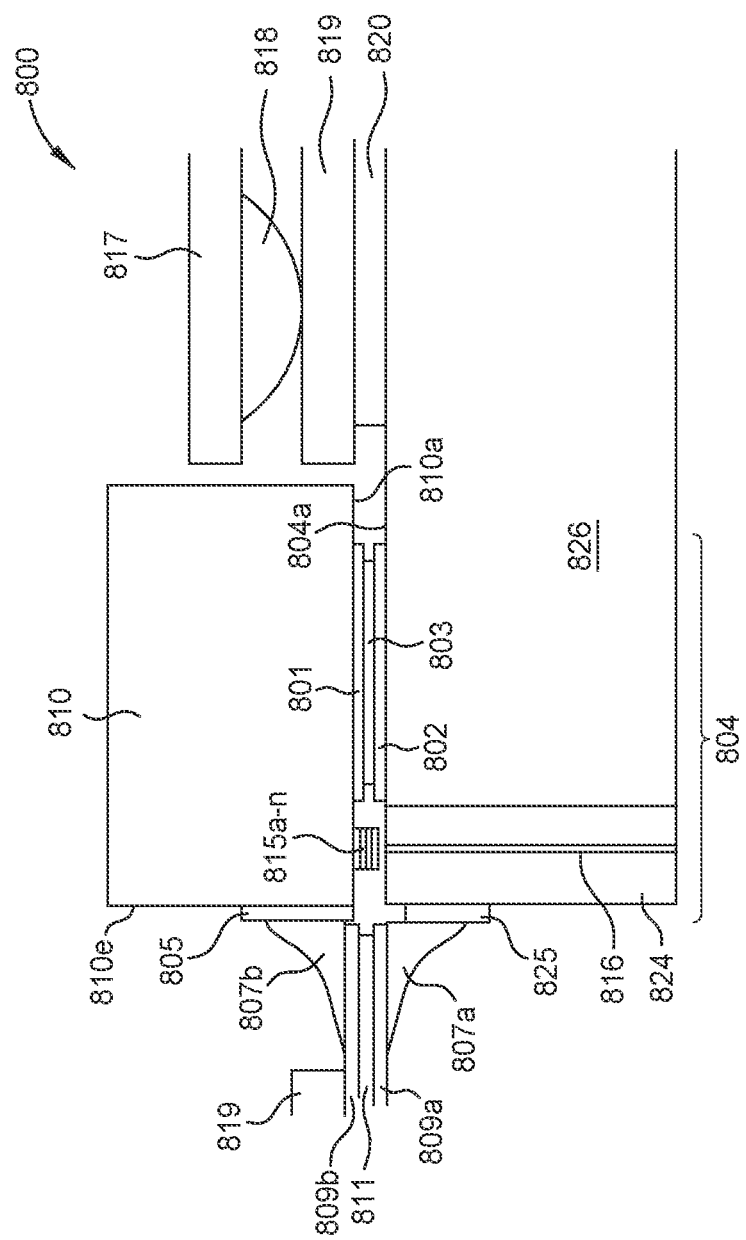
FIG. 8A is a schematic illustration of a cross-sectional view of an example slider having an example VCSEL mounted thereto according to at least one embodiment of the present disclosure.
Figure 8C:
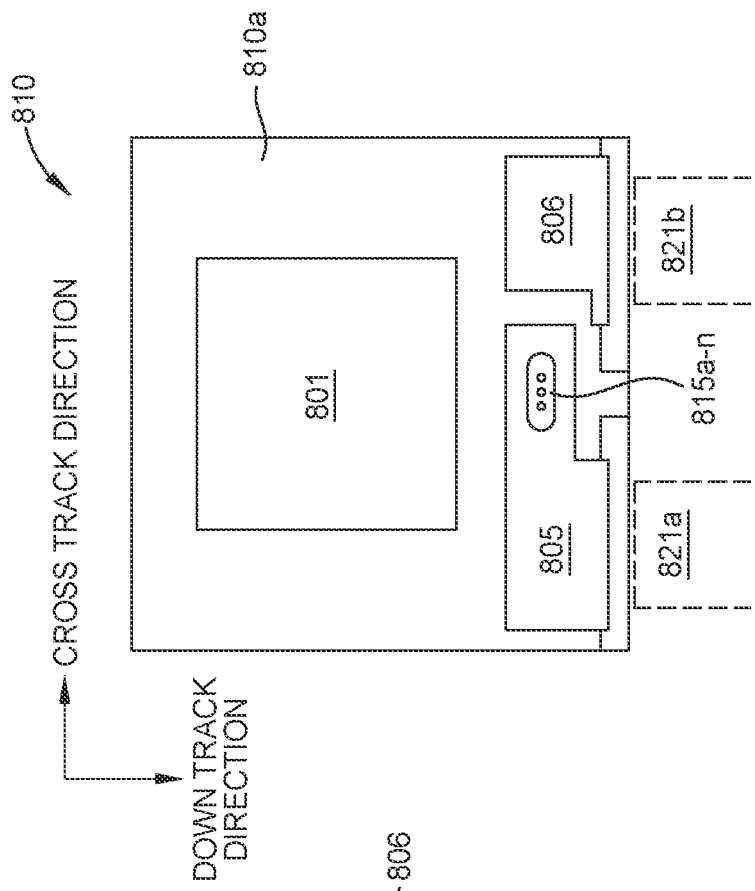
FIG. 8C is a bottom view of the example VCSEL shown in FIG. 8B according to at least one embodiment of the present disclosure.
Figure 8B:
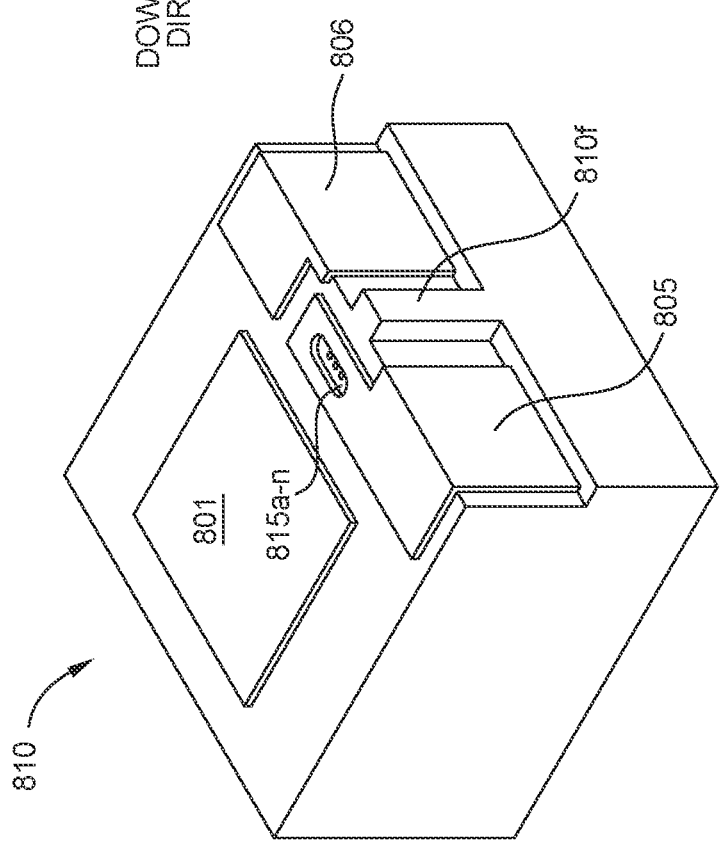
FIG. 8B is a perspective view of an example VCSEL according to at least one embodiment of the present disclosure.

FIG. 8A is a schematic illustration 800 of a side view of a slider 804 having a VCSEL 810 chip mounted thereto according to some embodiments. The schematic illustration 800 can be a portion of an HGA. FIGS. 8B and 8C are a perspective view and a bottom view, respectively, of the VCSEL 810 shown in FIG. 8A. FIGS. 8A-8C are a special case of the VCSEL where the laser diode electrodes are located on the front surface 810f of the VCSEL 810. In these embodiments, the suspension can include double layer electrodes as shown in FIG. 8A, whereas the VCSEL 410, VCSEL 610, VCSEL 620, and VCSEL 710 include a single layer of electrodes on the suspension.

Referring to FIG. 8A, the VCSEL 810 is mounted to the slider 804 via a pad 801, a pad 802, and a soldering material 803. The pad 801 and the pad 802 can each, independently, be a metal containing layer. The slider 804 includes a substrate, e.g., an AlTiC substrate, and a layer 824, e.g., an alumina containing layer. The pad 801 is coupled to the bottom surface 810a of the VCSEL 810 and the pad 802 is coupled to a top surface 804a of the slider 804. The pad 801, the pad 802, and the soldering material 803 can collectively form a contact after soldering. A conductive adhesive can be used in addition to, or instead of, the soldering material 803.

A laser diode electrode 805 is coupled to, or positioned on, a front surface (e.g., a front surface 810f) of the VCSEL 810. Although only one laser diode electrode 805 is shown coupled to the front surface 810f, another laser diode electrode (e.g., laser diode electrode 806 shown in FIG. 8B) is coupled to the same front surface 810f of VCSEL 810. The laser diode electrodes 805, 806 extend from the front surface 810f of the VCSEL 810 to the bottom surface 810a of the VCSEL 810 as shown in FIGS. 8B and 8C.

The VCSEL 810 includes one or more cavities 815a-n through which one or more laser beams exit the VCSEL 810 and enter a single output waveguide 816 positioned within the layer 824. Any suitable number of cavities can be used such as from about 1 to about 16, such as from about 3 to about 12. Higher or lower number of cavities are contemplated. Each of the one or more laser beams emitted by the VCSEL 810 can operate at the same frequency and can be phase coherent. Each laser of the one or more laser beams emitted by the VCSEL 810 can have a power level from about 0.5 mW to about 20 mW, such as from about 1 mW to about 10 mW, such as from about 2 mW to about 8 mW, such as from about 4 mW to about 6 mW. Higher or lower power levels are contemplated. Although not shown, a multimode interference (MMI) device can be used and be disposed within the slider 804. When used, the MMI device combines the laser light fed from the cavities 815a-814n and emits a single laser through a single output waveguide 816. The single output waveguide 816 can emit laser light from the MMI device that includes the combined power of the plurality of input lasers accepted by the MMI device. The single output mode can be utilized to concentrate the optical power and couple to an NFT (e.g., NFT 284).

Referring to FIG. 8A, a slider pad 825 is coupled to a surface of the layer 824 of the slider 804. The slider pad 825 and the laser diode electrode 805 are coupled to a multilayer structure that includes a lower electrode 809a, a polyimide layer 811 disposed above the lower electrode 809a, and an upper electrode 809b disposed over the polyimide layer 811. Coupling of the slider pad 825 and the laser diode electrode 805 to the multilayer structure can be accomplished by soldering materials 807a and 807b, respectively. A conductive adhesive can be used in addition to, or instead of, the soldering materials 807a, 807b. Laser diode electrode 806 is also coupled to the multilayer structure in a same, or similar, manner as laser diode electrode 805.

A suspension (a portion of which is shown) which supports the slider 804 is disposed on the same surface of the slider 804 as the pad 802, e.g., a top surface 804a. A portion of the suspension is shown in FIG. 8A. The suspension includes a flexure 819 and a load beam 817. The load beam is the main body of the suspension. The flexure 819 holds the slider 804, and the flexure 819 is attached to the load beam 817. In operation, the load beam 817 can push the slider 804 toward a disk with a dimple 818. Between the flexure 819 and the slider 804 is disposed a polyimide layer 820 that includes wires. The wire layer is for applying current or voltage to the components in the slider (magnetic head, heater for spacing control etc.) or for sending signals from the sensors (reader, contact sensor, thermal sensor) to the preamp. In the bottom view of the VCSEL 810 (FIG. 8C) is shown the electrodes 821a, 821b on the suspension. In FIG. 8C, electrodes 821a and 821b correspond to the upper electrodes 809b. FIG. 8C also shows the directional movement, e.g., cross-track direction and down track direction, of the VCSEL 810.

One difference from FIG. 4A is the laser diode electrodes 805, 806 are not coupled to the multilayer structure in the same manner as that shown in FIG. 4A. The VCSEL 810 can be positioned on an HGA in a suitable manner similar to that shown in FIG. 5. Properties, characteristics, and uses (e.g., in an HGA assembly, a magnetic media drive, etc.) of the VCSEL 810 chip can be the same as, or similar to, those properties, characteristics, and uses of the VCSEL 410 chip discussed above.

The VCSELs described herein enable, e.g., active alignment to maximize the coupling between the waveguide and the laser during their use. The VCSELs described herein have an output beam that is larger and more circular than that of an EELD which increases the alignment tolerance and coupling efficiency to the slider spot size converter. Further, VCSELs described herein have mode hop-free operation due to, e.g., very short cavity length with one longitudinal mode and DBR mirror selectivity while EELDs suffer from mode hops. Mode hopping can cause a small (typically 1-2%) change in laser power to suddenly occur during the recording process. The VCSELs do not require burn-in during manufacturing which further lowers cost. Since the VCSEL cavity length is shorter than EELDs, and because the laser is mounted on top of the slider, the lower overall height allows for a reduced disk-to-disk spacing, potentially more disks, and for higher HDD capacity.

Example Fabrication Processes

Figure 9:
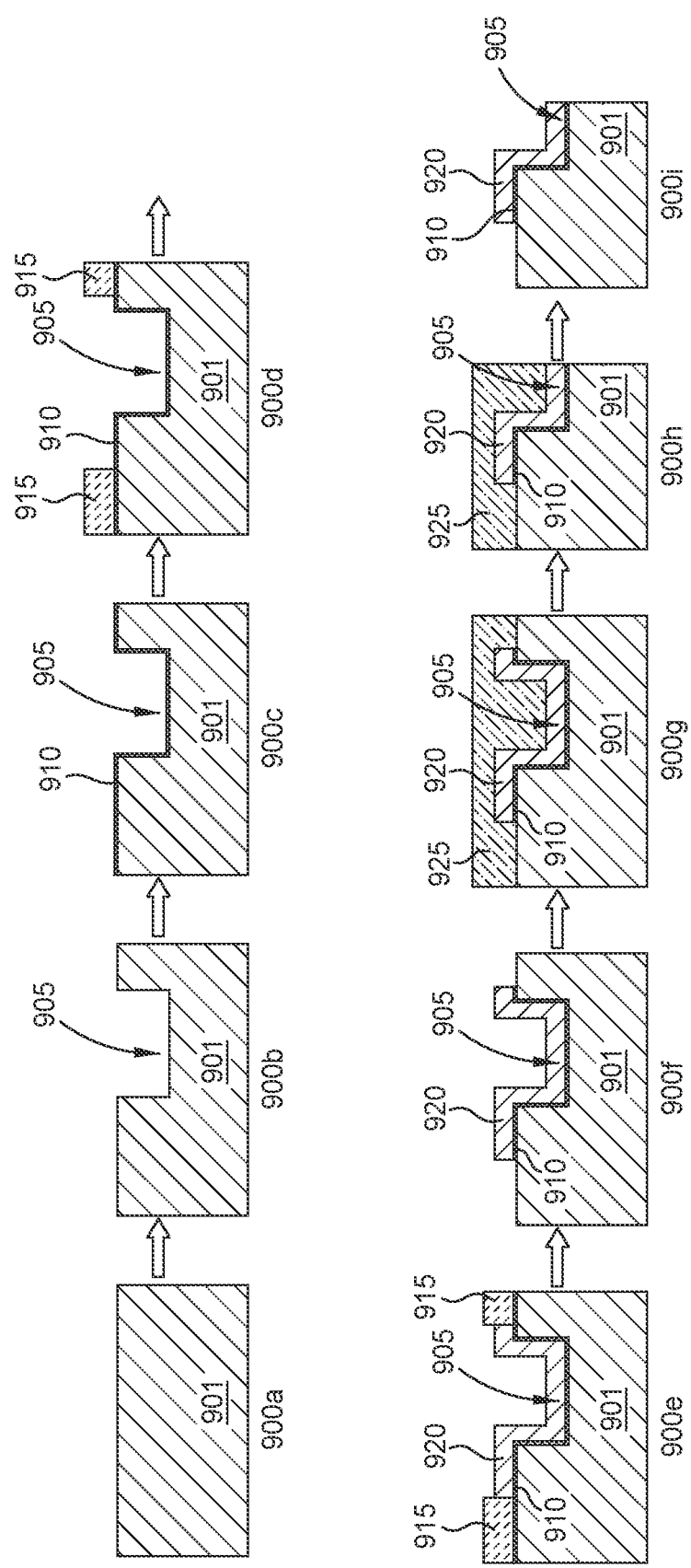
FIG. 9 is a process flow diagram showing selected operations of an example process for forming an electrode on a side surface of a VCSEL according to at least one embodiment of the present disclosure.
Figure 10:
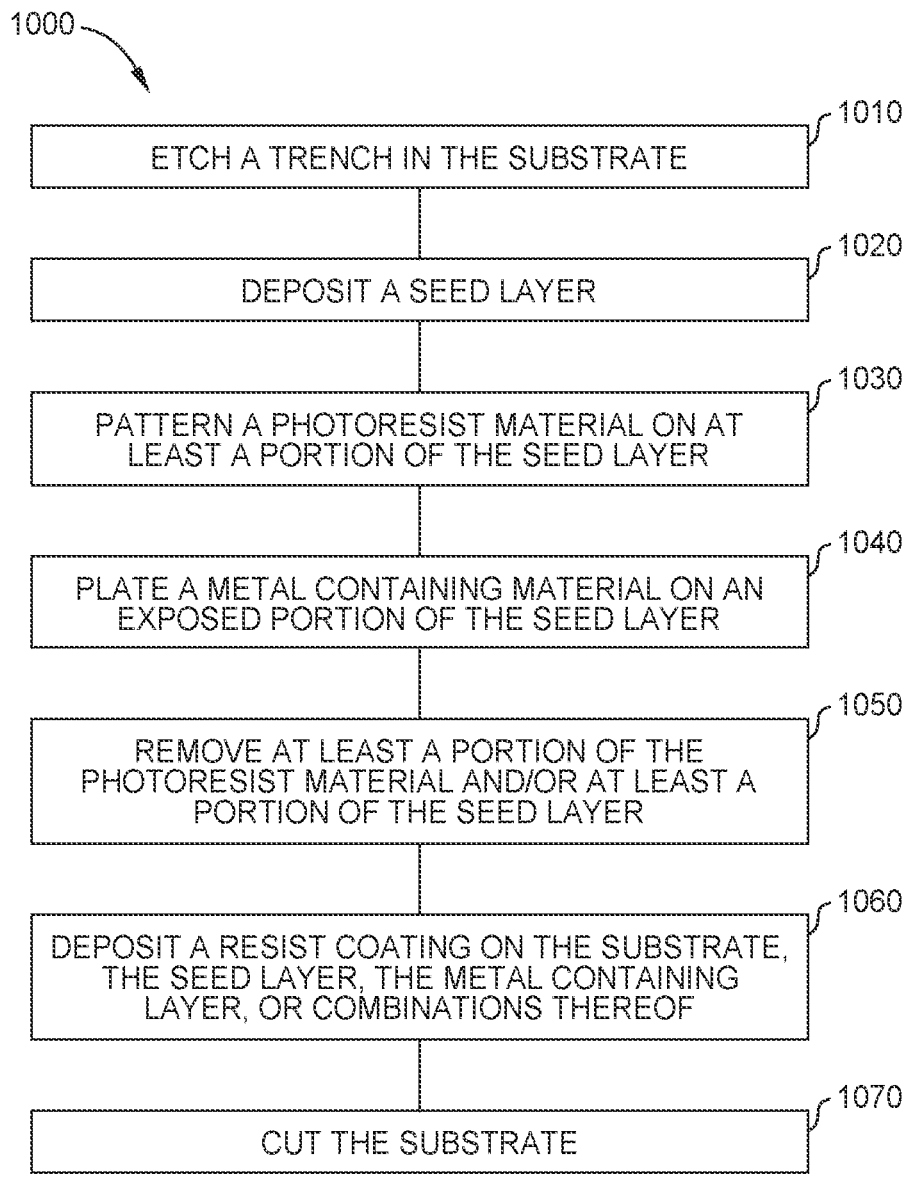
FIG. 10 is a flowchart showing selected operations of an example process for forming an electrode on a side surface of a VCSEL according to at least one embodiment of the present disclosure.

The present disclosure also relates to fabrication processes for forming a portion of one or more VCSELs described herein. FIG. 9 is a process flow diagram showing selected operations on a substrate during an example process 1000 (FIG. 10) for forming an electrode on a side surface of a VCSEL.

The process begins with selecting a substrate 900a. The substrate may be formed of a suitable substrate material 901. Materials suitable for the substrate material 901 include, but are not limited to, Ga, As, Al, In, alloys thereof, and combinations thereof. Illustrative, but non-limiting, examples of materials suitable for the substrate material 901 include GaAs, AlAs, AlGaAs, InGaAs, InGaAsN, GaAsN, GaAsP, InP, InGaAsP.

The substrate material 901 is then etched by suitable methods to form a trench 905 at operation 1010. This etch process to form a wafer 900b can be a single-step etch treatment or a multi-step etch treatment (e.g., a two-step etch treatment, a three-step etch treatment, or more steps). The area etched for each step of the multi-etch treatment can be different. Etching can be performed by a dry etch plasma, utilizing wet etchants, ion milling, reactive ion etch, reactive ion beam etching, or combinations thereof. The etch process of operation 1010 can be performed in order to form n trenches of n depths. For example, a first trench having a first depth can be formed, a second trench having a second depth can be formed, a third trench having a third depth can be formed, and so forth. The depths of the trenches can be the same or different. As a non-limiting example of operation 1010, the etch process can be achieved by a reactive ion etch utilizing suitable etchant materials such as a chlorine-containing material (e.g., HCl and/or $Cl_2$), but any number of gases or mixtures thereof could be used. A carrier gas such as a non-reactive gas, e.g., argon, can be utilized during the etch process of operation 1010.

A seed layer 910 comprising any suitable conductive material such as copper (Cu) or a noble metal, e.g., gold (Au), ruthenium (Ru), or combinations thereof, can then be deposited at operation 1020 to form a wafer 900c. The seed layer 910 is deposited in the trench 905, on one or more sidewalls of the trench 905, and/or the surface of the substrate that extends above the trench 905. The seed layer formed at operation 1020 can be an electrode for a VCSEL.

The deposition of operation 1020 can be performed by any suitable technique such as sputtering, atomic layer deposition (ALD), and/or ion beam deposition (IBD). Other suitable metal deposition techniques for depositing the seed layer 910, such as electron-beam and/or resistive evaporation, can be utilized in addition to, or as an alternative to, sputtering, ALD, and/or IBD. The directionality of the deposition can be controlled when using IBD.

In some embodiments, and prior to depositing the seed layer 910, an insulating layer (e.g., $SiO_2$ and/or $Al_2O_3$) may be deposited on at least a portion of the wafer 900b, such as in the trench 905, the one or more sidewalls of the trench 905, and/or the surface of the substrate that extends above the trench 905. The seed layer 910 can then be deposited on at least a portion of this insulating layer if desired.

A photoresist material 915 can then be patterned on wafer 900c by any suitable photolithographic process on at least a portion of the seed layer 910 at operation 1030. The photoresist material 915 can be formed using spray coating, spin coating, or other suitable methods. The wafer 900d, having a photoresist material disposed thereon, is utilized to control plating of a metal-containing layer in a subsequent operation discussed below. In some embodiments, a thickness of the photoresist material 915 can be selected such that the photoresist material 915 is removed in a subsequent operation (e.g., an operation after plating) and can range in thickness from about 3 µm to about 15 µm, such as from about 4 µm to about 12 µm. The photoresist material 915 having a larger or smaller thickness is contemplated. If desired, a plasma clean using, e.g., $O_2$ and/or water in combination with ammonium hydroxide ($NH_4OH$), can be performed to clear any of the photoresist left on undesired portions of the seed layer 910.

Once the opened areas, as defined by the photoresist material 915, are formed, a metal plate 920 is then deposited by suitable methods on at least a portion of wafer 900d to form a wafer 900e at operation 1040. For example, the metal plate 920 can be plated onto at least a portion of the seed layer 910 such as portions of the seed layer in the trench, or sidewall thereof, as well as on the surface of the seed layer 910 above the trench 905. The metal plate 920 can include non-metals. Illustrative, but non-limiting, examples of metals useful for operation 1040 include Au, Cu, Pd, Pt, or combinations thereof, though other metals are contemplated. The thickness of the metal plate 920 can vary. In some embodiments, the thickness of the metal plate 920 is from about 1 µm to about 15 µm, such as from about 2 µm to about 10 µm, such as from about 3 µm to about 5 µm. Larger or smaller thicknesses of the metal plate 920 are contemplated.

The metal plate 920 can be deposited by plating, but other deposition methods such as sputtering, vacuum evaporation, and/or ion beam deposition can be used. When sputtering, vacuum evaporation, and/or ion beam deposition are used, operation 1020 (formation of the seed layer 910) can be skipped, if desired.

At least a portion of the photoresist material 915 and/or at least a portion of the seed layer 910 is then removed from the wafer 900e by any suitable method, such as milling, at operation 1050. As shown by wafer 900f, portions of the seed layer 910 that are removed during operation 1050 can include those that were previously disposed below the photoresist material 915.

The milling process of operation 1050 can be performed utilizing solvent(s), a plasma clean, or a combination thereof. The wafer 900f, now formed, includes various exposed surfaces, such as exposed surfaces of the substrate material 901, exposed surfaces of the metal plate 920, and/or exposed surfaces of the seed layer 910. If desired, operation 1050 can be performed in more than one operation whereby the at least a portion of the photoresist material 915 is removed prior to the at least a portion of the seed layer 910. In some embodiments, a portion of the metal plate 920 can be removed during or after removal of the seed layer 910 by, e.g., milling. Since the thickness of the metal plate 920 is thicker than the seed layer 910, the seed layer 910 outside the metal plate 920 area is removed but the metal plate 920 remains.

Alternatively, and in some embodiments, the seed layer 910 can be patterned using photolithography before plating of the metal plate 920 such that the example process 1000 for forming the VCSEL can be free of milling the seed layer 910.

An optional operation 1060 can then be performed to deposit a resist coating 925 on one or more exposed portions of the wafer 900f to form a wafer 900g. The resist coating 925 can be formed using spray coating, spin coating, and/or other suitable methods. Illustrative, but non-limiting, examples of photoresist types used for the resist coating 925 can include UV negative resist, g/i-line positive resist, KrF positive resist, and/or ArF positive resist. In addition to, or an alternative to the photoresist, a resin that dissolves by solution can be utilized. As illustrated by the wafer 900g, the deposition forms the resist coating 925 on at least a portion of the metal plate 920, at least a portion of the seed layer 910, at least a portion of the substrate material 901, or combinations thereof. The resist coating serves to, e.g., protect the metal plate 920, seed layer 910, substrate material 901, or combinations thereof, during a subsequent dicing operation.

The wafer 900g is then diced, sliced, cleaved, or otherwise cut into one or more individual chips 900h at operation 1070. Here, and in some embodiments, the wafer is cut along the trench 905 into discrete die with a blade, saw, scribe, laser dicing, stealth dicing, and/or other suitable apparatus using suitable methods.

If the one or more individual chips 900h include a resist coating 925 (e.g., formed during the optional operation 1060), the resist coating 925 can be removed after the dicing operation to form wafer 900i. Removal of the resist coating 925 can be performed by, e.g., by dipping the wafer in resist removal solution, placing the wafer in an $O_2$ asher, and/or other suitable methods.

Other operations can include cleaning the wafer before and/or after one or more operations of the example process 1000. Cleaning can be performed by suitable methods such as dipping in a cleaning solution, ultrasonic cleaning, $UV/O_3$ cleaning, brush cleaning, polishing, and/or $CO_2$ cleaning.

Other illustrative, but non-limiting, example process schemes for forming a VCSEL, where the laser diode electrodes formed on a side surface of the VCSEL, are contemplated.

In an embodiment, a process for forming a vertical cavity surface emitting laser (VCSEL) device includes forming a trench in a substrate, forming two laser diode electrodes in the trench, and after forming the two laser diode electrodes, cutting the substrate along the trench to form a VCSEL, the VCSEL comprising a chip for mounting on a slider, the chip having six surfaces, wherein a first surface of the chip is for facing the slider, a second surface of the chip is opposite the first surface, the two laser diode electrodes being positioned in any combination on one or more of a third surface, a fourth surface, a fifth surface, or a sixth surface.

In another embodiment, a process for forming a vertical cavity surface emitting laser (VCSEL) device includes etching one or more trenches in a substrate, forming two laser diode electrodes in the one or more trenches, after forming the two laser diode electrodes, cutting the substrate along the one or more trenches to form a VCSEL, the VCSEL comprising a chip for mounting on a slider, the chip having six surfaces, wherein a first surface of the chip is for facing the slider a second surface of the chip is opposite the first surface, and the two laser diode electrodes being positioned in any combination on one or more of a third surface, a fourth surface, a fifth surface, or a sixth surface.

In another embodiment, a process for forming a vertical cavity surface emitting laser (VCSEL) device includes etching one or more trenches formed therein in a substrate, depositing a seed layer comprising a conductive material on the substrate, patterning a photoresist material on the seed layer, plating a metal containing material on at least a portion of the seed layer that is free of the photoresist material, removing the photoresist material and a portion of the seed layer from the substrate, and cutting the substrate along the one or more trenches of the substrate after removing the photoresist material and the portion of the seed layer to form a VCSEL device described herein.

In some embodiments, a process for forming a VCSEL device (such as those described herein) includes forming a trench in a substrate; forming laser diode electrodes in the trench; and after forming the laser diode electrodes, cutting the substrate along the trench to form the VCSEL. The laser diode electrodes can be formed by, e.g., depositing a seed layer comprising a conductive material on the substrate; patterning a photoresist material on the seed layer; and plating a metal containing material on at least a portion of the seed layer that is free of the photoresist material. The seed layer can be deposited by various operations including, but not limited to, sputtering, atomic layer deposition, ion beam deposition, or combinations thereof.

Figure 11A:
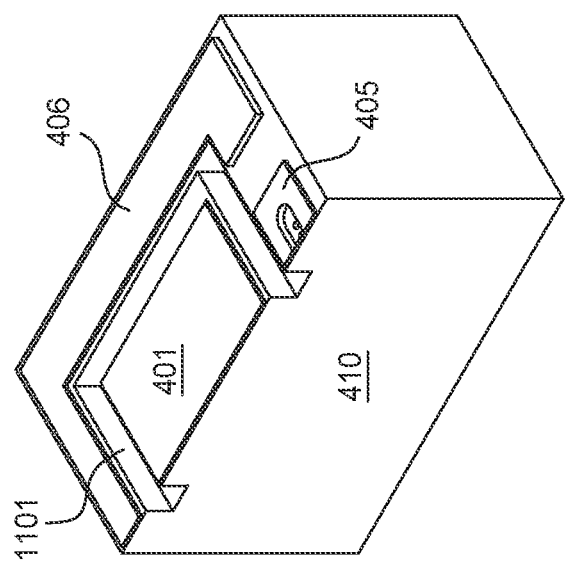
FIG. 11A shows a perspective view of a portion of an example VCSEL according to at least one embodiment of the present disclosure.
Figure 11B:
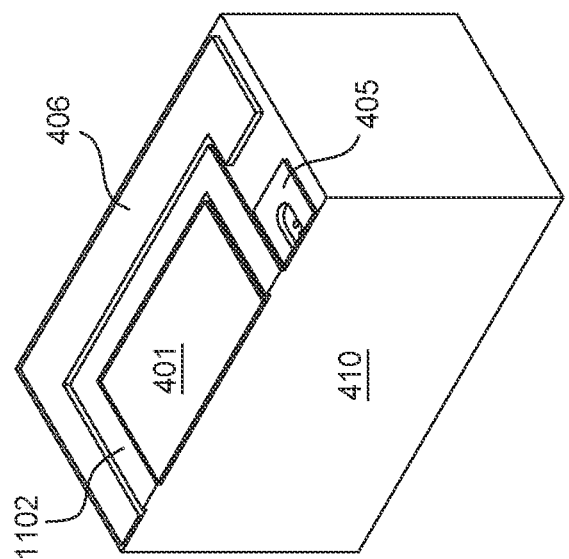
FIG. 11B shows a perspective view of a portion of an example VCSEL according to at least one embodiment of the present disclosure.

FIGS. 11A and 11B show a perspective view of a portion of an example VCSEL chip according to some embodiments. As shown, the VCSEL chip (e.g., VCSEL 410) is cut in, e.g., half. The VCSEL may include a trench 1101 (FIG. 11A) or a protrusion 1102 (FIG. 11B) located between or otherwise disposed between the pad 401 and the laser diode electrodes 405, 406. The solder (e.g., soldering material 403), not shown, between the VCSEL and a slider (e.g., slider 404) may expand during the soldering process and contact the laser diode electrodes 405, 406 of the VCSEL. The trench 1101 or protrusion prevents (or at least mitigates) the solder from contacting the laser diode electrodes 405, 406 of the VCSEL.

The depth of the trench 1101 can be, e.g., about 10 µm, but it may be larger or smaller. The height of the protrusion can be equal to a thickness of the pad 401 plus the thickness of the solder, but it may be larger or smaller. In some embodiments, an insulating layer may be deposited on or near the trench 1101. In some embodiments, an insulating layer may be deposited on or near the protrusion 1102. A trench or a protrusion can be used for any suitable VCSEL described herein.

The VCSELs, HGAs for mounting VCSELs, and devices incorporating such articles such as magnetic media drives are provided. Processes for fabricating VCSELs are also provided. The embodiments described herein, unlike conventional VCSELs, enable, e.g., active alignment to maximize the coupling between the waveguide and the laser during use.

In the foregoing, reference is made to embodiments of the disclosure. However, it should be understood that the disclosure is not limited to specific described embodiments. Instead, any combination of the foregoing features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the foregoing aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise.

While the foregoing is directed to embodiments of the present disclosure, other and further embodiments of the disclosure may be devised without departing from the basic scope thereof, and the scope thereof is determined by the claims that follow.

What is claimed is:

1. A vertical cavity surface emitting laser (VCSEL) device, comprising:
  a chip for mounting on a slider, the chip having six surfaces, wherein:
    a first surface of the chip is for facing the slider, the first surface of the chip comprising a pad to couple the chip to the slider;
    a second surface of the chip is opposite the first surface; and
    two laser diode electrodes positioned in any combination on one or more of a third surface, a fourth surface, a fifth surface, or a sixth surface of the chip, wherein the two laser diode electrodes extend from one or more of the third surface, the fourth surface, the fifth surface, or the sixth surface to the first surface of the chip, the two laser diode electrodes extending along at least a portion of the perimeter of the first surface of the chip.

2. The VCSEL device of claim 1, wherein the two laser diode electrodes are positioned on the third surface.

3. The VCSEL device of claim 1, wherein the two laser diode electrodes are positioned on the third surface and the fourth surface.

4. The VCSEL device of claim 1, wherein one or more laser apertures are disposed in the first surface.

5. The VCSEL device of claim 4, wherein the VCSEL device is capable of emitting one or more lasers corresponding to the one or more laser apertures.

6. The VCSEL device of claim 4, wherein the one or more laser apertures includes 2-16 laser apertures.

7. The VCSEL device of claim 4, wherein, when the VCSEL device has a plurality of laser apertures disposed in the first surface, the plurality of laser apertures:
  are spaced apart by a distance of about 1 µm to about 20 µm;
  are linearly arranged;

operate at the same frequency; or
combinations thereof.

8. The VCSEL device of claim 1, further comprising a trench, wherein each of the laser diode electrodes are positioned in the trench.

9. The VCSEL device of claim 1, further comprising a first trench and a second trench, wherein a first laser diode electrode of the two laser diode electrodes is positioned in the first trench and a second laser diode electrode of the two laser diode electrodes is positioned in the second trench.

10. The VCSEL device of claim 1, wherein, when the VCSEL device is capable of emitting a plurality of lasers, the plurality of lasers being phase coherent.

11. The VCSEL device of claim 1, wherein the VCSEL device further comprises:
a trench having a metal layer deposited thereon;
and an electrode on the first surface of the chip coupled to the metal layer, the electrode on the first surface of the chip being a different electrode than the two laser diode electrodes.

12. The VCSEL device of claim 11, wherein a portion of the metal layer is disposed on a side surface.

13. A magnetic media drive comprising the VCSEL device of claim 1.

14. A head gimbal assembly, comprising:
a suspension;
a slider mounted on the suspension; and
a vertical cavity surface emitting laser (VCSEL) device mounted on the slider, the VCSEL device comprising:
a chip for mounting on the slider, the chip having six surfaces, wherein:
a first surface of the chip is coupled to a top surface of the slider, the first surface of the chip comprising a pad to couple the chip to the slider; and
a second surface of the chip is opposite the first surface; and
two laser diode electrodes positioned in any combination on one or more of a third surface, a fourth surface, a fifth surface, or a sixth surface of the chip, wherein the two laser diode electrodes extend from one or more of the third surface, the fourth surface, the fifth surface, or the sixth surface to the first surface of the chip, the two laser diode electrodes extending along at least a portion of the perimeter of the first surface of the chip.

15. The head gimbal assembly of claim 14, wherein the two laser diode electrodes are connected to one or more electrodes of the suspension.

16. The head gimbal assembly of claim 14 further comprising:
a main pole;
a near field transducer (NFT) coupled between the main pole and a leading shield; and
a waveguide structure coupled to the NFT, the waveguide structure comprising a first waveguide coupled to the NFT.

17. The head gimbal assembly of claim 16, wherein the waveguide structure further comprises:
a multimodal interference (MMI) device coupled to the first waveguide at a first end; and
a plurality of second waveguides coupled to a second end opposite the first end of the MMI device, the plurality of second waveguides extending from the MMI device to the top surface of the slider.

18. The head gimbal assembly of claim 14, wherein the two laser diode electrodes are positioned on different surfaces of the chip.

19. The head gimbal assembly of claim 14, wherein the two laser diode electrodes are positioned on the same surface of the chip.

20. A magnetic media drive comprising the head gimbal assembly of claim 14.

21. A head gimbal assembly, comprising:
a metal pad;
a vertical cavity surface emitting laser (VCSEL) device comprising:
a chip for mounting on a slider, the chip having six surfaces, wherein:
a first surface of the chip is for facing the slider, the first surface of the chip comprising a pad to couple the chip to the slider;
the first surface is coupled to the metal pad; and
a second surface of the chip is opposite the first surface; and
two laser diode electrodes positioned in any combination on one or more of a third surface, a fourth surface, a fifth surface, or a sixth surface of the chip, wherein the two laser diode electrodes extend from one or more of the third surface, the fourth surface, the fifth surface, or the sixth surface to the first surface of the chip, the two laser diode electrodes extending along at least a portion of the perimeter of the first surface of the chip.

22. The head gimbal assembly of claim 21, wherein a metal of the metal pad is combined with a metal of at least one of the two laser diode electrodes.

23. A magnetic media drive comprising the head gimbal assembly of claim 21.

* * * * *